United States Patent [19]

Marchionni et al.

[11] Patent Number: 5,354,922

[45] Date of Patent: Oct. 11, 1994

[54] PERFLUOROPOLYOXYALKYLENE ENDOWED WITH A HIGH VISCOSITY AND A LOW PEROXIDE OXYGEN CONTENT, AND PROCESS FOR PREPARING THEM

[75] Inventors: Giuseppe Marchionni; Anna M. Staccione, both of Milan; Pier A. Guarda, Turin, all of Italy

[73] Assignee: Ausimont S.p.A., Milan, Italy

[21] Appl. No.: 871,991

[22] Filed: Apr. 22, 1992

[30] Foreign Application Priority Data

Apr. 26, 1991 [IT] Italy .................. MI 91 A001155

[51] Int. Cl.$^5$ ............................................. C07C 409/00
[52] U.S. Cl. ..................................... 568/560; 560/302; 204/157.92
[58] Field of Search .............. 560/302; 568/672, 560; 204/157.92

[56] References Cited

U.S. PATENT DOCUMENTS

| | | | |
|---|---|---|---|
| 3,715,378 | 2/1973 | Sianesi et al. | 560/302 |
| 3,810,874 | 5/1974 | Mitsch et al. | 568/560 |
| 3,847,978 | 11/1974 | Sianesi et al. | |
| 4,451,646 | 5/1984 | Sianesi et al. | 560/302 |
| 4,500,739 | 2/1985 | Caporiccio et al. | |
| 4,668,357 | 5/1987 | Marchionni et al. | 568/560 |
| 4,859,299 | 8/1989 | Kobayashi et al. | 560/302 |
| 4,952,735 | 8/1990 | Kobayashi et al. | 568/560 |
| 5,000,830 | 3/1991 | Marchionni et al. | 568/560 |
| 5,051,158 | 9/1991 | Marchionni et al. | 204/157.6 |

FOREIGN PATENT DOCUMENTS

| | | | |
|---|---|---|---|
| 0393700 | 10/1990 | European Pat. Off. | 568/560 |
| 0393705 | 10/1990 | European Pat. Off. | 568/560 |
| 9012832 | 11/1990 | PCT Int'l Appl. | 568/560 |

Primary Examiner—Marianne M. Cintins
Assistant Examiner—Keith MacMillan
Attorney, Agent, or Firm—Bryan Cave

[57] ABSTRACT

Peroxy perfluoropolyoxyalkylenes are prepared with high yields by carrying out the photo-oxidation of tetrafluoroethylene with molecular oxygen, by means of ultraviolet radiations, operating in the presence of pentafluorochloroethane as a solvent for tetrafluoroethylene.

Thus, it is possible to obtain peroxy perfluoropolyoxyalkylenes having a viscosity at 20° C. ranging from 300,000 to 8,000,000 cSt and endowed with a peroxide content not higher than 4.

Such perfluoropolyoxyalkylenes provide, through chemical reduction, perfluoropolyoxyalkylenes endowed with a functionality higher than 1.9 and at the same time with a high molecular weight.

7 Claims, No Drawings

PERFLUOROPOLYOXYALKYLENE ENDOWED WITH A HIGH VISCOSITY AND A LOW PEROXIDE OXYGEN CONTENT, AND PROCESS FOR PREPARING THEM

The invention relates to peroxy perfluoropolyoxyalkylenes having a high viscosity and a high molecular weight and to a process for preparing them.

In particular it relates to peroxy perfluoropolyoxyalkylenes endowed with a high viscosity and a high molecular weight which are suited to prepare, by reduction, perfluoropolyoxyalkylenes endowed with a high functionality and a high molecular weight, and it relates furthermore to a process for obtaining such peroxy perfluoropolyoxyalkylenes with high yields and conversions.

From U.S. Pat. No. 4,859,299 it is known to prepare perfluoropolyoxyalkylenes containing halogen atoms in the macromolecule by effecting the photo-oxidation of tetrafluoroethylene under ultraviolet radiations in a fluorinated or chlorofluorinated solvent, in the presence of chain transfers consisting of halogenated hydrocarbons.

As solvents there are mentioned dichlorotetrafluoroethane, trichlorotrifluoroethane, dichlorodifluoromethane.

The perfluoropolyoxyalKylenes so obtained have structure $—(C_2F_4O)_a—(CF_2O)_b—(O)_c—$, a molecular weight ranging from 200 to 25,000, $$\frac{c}{a+b}$$

ratios ranging from 0.01 to 1, and b/a ratios ranging from 0.1 to 10.

Furthermore, from U.S. Pat. No. 4,451,646 it is known to prepare perfluoropolyoxyalkylenes having a high molecular weight by subjecting tetrafluoroethylene to photo-oxidation in a fluorinated or chlorofluorinated solvent such as dichlorodifluoromethane, perfluorodimethylcyclobutane, 1,2dichlorotetrafluoroethane, 1,2-dichlorohexafluoropropane, operating at temperatures ranging from $-80$ to $-35°$ C., with $C_2F_4/O_2$ molar ratios ranging from 0.1 to 2 and F/VxE ratios higher than $3 \times 10^{-4}$ (where F is the number of mols of $C_2F_4$ fed per hour, V is the reactor volume in ml and E represents the watts of ultraviolet radiation with wavelength lower than 330 nm.)

Operating according to said process there are obtained perfluoropolyoxyalkylenes with a theoretical number average weight not higher than 116,000, the conversions being not higher than 35%.

Such perfluoropolyoxyalkylenes exhibit a peroxide content, for molecular weights higher than 75,000, which is higher than 5.

By reduction, such products provide perfluoropolyoxvalkylenes having a very low molecular weight and a high functionality.

Lastly, from U.S. Pat. No. 4,500,739 it is known to prepare high-viscosity perfluoropolyoxyalkylenes by subjecting tetrafluoroethylene to photo-oxidation in a solvent consiting of difluorodichloromethane, filtering the ultraviolet radiations by means of an aqueous solution of $CuSO_4$ at a concentration up to 2% so as to eliminate the radiations with $\lambda < 280$ nm.

According to such process it is possible to obtain perfluoropolyoxyalkylenes having a viscosity not exceeding 300,000 cSt at 25° C.

In such perfluoropolyoxyalkylenes, the peroxide oxygen content is equal to at least 4.1 for a viscosity equal to or higher than 300,000 cSt.

Such products, subjected to reduction of the peroxide oxygen, can provide perfluoropolyoxyalkylenes having a high content of difunctional products, but a very low molecular weight.

An object of the present invention are peroxy perfluoropolyoxyalkylenes of general formula:

$$T—O(CF_2O)_4 (CF_2CF_2O)_p —(—O)_s—T''$$

where T, T', like or different from each other, are $—CF_3$, $—C_2F_5$, $—CF_2Cl$, $—CF_2CF_2Cl$, $—COF$, $—CF_2COF$ having a viscosity (at 20° C.) ranging from 300,000 to 8,000,000 cSt, but preferably from 500,000 to 6,000,000, and a peroxide oxygen content not higher than 4, and preferably ranging from 0.1 to 3.5, but more preferably from 0.3 to 3.5.

In the above-mentioned perfluoropolyoxyalkylenes, the value of the P/q ratio preferably ranges from 0.4 to 5, more preferably from 0.6 to 3.

The abovesaid viscosity values correspond, respectively, to weight average molecular weights (Mw) ranging from 140,000 to 420,000, with preferred values being those from 160,000 to 390,000, or to number average molecular weight (Mn) ranging from 100,000 to 300,000, with preferred values being those from 120,000 to 280,000.

The Mw values are generally measured by means of Light Scattering (L.S.) methods according to known techniques.

The Mn values can be measured by means of N.M.R. for Mn values up to about 200,000. For values higher than 200,000, reliable Mn values can be obtained through the empiric relation:

Viscosity (c. St.) $= K\, Mn^a$ where K, a are constants.

This relation is well known to those skilled in the art. It is reported for example in published European patent application No. 259,980, wherein the value of K and a, restectively equal to $6.05 \times 10^{-11}$ and 3.07, were determined in relation to Mn values (measured by means of NMR techniques) ranging from 15,000 to 50,000.

In order to apply such relation to the measures of the Mn values of the high molecular weight products of the present invention, the values of costants K and a were determined in relation to Mn values (determined by NMR) ranging from 9,000 to 200,000, tnereoy obtaining a value of $4.34 \times 10^{-10}$ for K and a value of 2.97 for a.

So it is possible, through absolute viscosity measures, to calculate the Mn values also if they exceed the limit value of 200,000, which can be calculated by means of NMR-based techniques.

A further object of the present invention is a process for preparing perfluoropolyoxyalkylenes which consists in subjecting tetrafluoroethylene to photo-oxidation by means of molecular oxygen, under the action of ultraviolet radiations having a wavelength ranging from 200 to 600 nm, operating in the presence of pentafluorochloroethane ($CF_3CF_2Cl$) as a solvent for tetrafluoroethylene.

Preferred conditions for practising such process consist in operating with values of the F/VxE ratio (where F, V, E have the meaning defined hereinbefore) ranging from 0.1 to $50 \times 10^{-4}$, and more preferably from 0.1 to $3 \times 10^{-4}$.

The photo-oxidation reaction is conducted at temperatures ranging from $-40$ to $-100°$ C., and preferably from $-45$ to $-80°$ C.

Flow conditions of tetrafluoroethylene such as to achieve a tetrafluoroethylene concentration in the solvent in the reactor of at least $6.10^{-2}$ moles/liter are suited for obtaining, in the presence of pentafluorochloroetane as the solvent, perfluoropolyoxialkylenes having viscosity of at least 300,000 cST.

In practice it is operated by bubbling a gaseous mixture of tetrafluoroethylene and oxygen, in $O_2/C_2F_4$ molar ratios ranging from 10 to 0.5, but preferably from 6 to 1, into the solvent maintained at the abovesaid temperature, in the presence of ultraviolet radiations. The total pressure of the gaseous reagents in the reaction area ranges from 0.01 to 10 atm., and preferably from 0.05 to 1 atm. The process of the invention not only permits to obtain products having a higher molecular weight and a lower peroxide content, but also to obtain such products with higher yields and conversions than in the processes of the prior art, in particular the ones described in U.S. Pat. Nos. 4,451,646 and 4,500,739, the operative conditions being equal.

The products forming one of the objects of the present invention can provide, by chemical reduction of the peroxide oxygen contained in them, perfluroopolyoxyalkylenes having a number average molecular weight ranging from 400 to 20,000 and a functionality respectively ranging from 1.99 to 1.88.

In particular, the products obtained from the chemical reduction of the peroxy perfluoropolyoxyalkylenes of the invention exhibit, with a molecular weight being equal to the molecular weight of those of the prior art, a considerably higher functionality or, vice-versa, with the functionality being equal, they exhibit a much higher molecular weight.

This is possible because the peroxy perfluoropolyoxyalkylenes according to the invention exhibit - the peroxide oxygen content being equal - a much nigher molecular weight (and therefore higher viscosity) than the products of the prior art, thereby permitting to obtain, in particular, reduction derivatives having an equal molecular weight but a much higher functionality.

With reference to a few of the examples given hereinafter, the following table shows the characteristics of the reduction products obtained from the peroxy perfluoropolyoxyalkylenes according to the invention in comparison with the ones obtained from the peroxy perfluoropolyoxyalkylenes of the prior art.

| Example | Peroxide precursor | | | Reduction derivative | |
|---|---|---|---|---|---|
| | PO | Mn | Viscosity (cSt) | Mn | Functionality |
| 1 | 2.6 | 200,000 | 3,200,000 | 1,000 | 1.99 |
| 4 | 1.8 | 70,000 | 54,000 | 1,270 | 1.98 |
| 5 (comp) | 1.5 | 11,000 | 387 | 1,350 | 1.83 |
| 2 (comp) | 2.1 | 16,200 | 1,150 | 870 | 1.94 |

The chemical reduction of the peroxy groups is effected according to conventional techniques such as, for example, the ones described in U.S. Pat. Nos. 4,451,646 and 3,847,978.

The reduction of the peroxy groups can be directly carried out on the fluoroolefin photo-oxidation product, or it can be carried out after a thermal and/or photochemical treatment of such product, according to conventional techniques, such as e.g. the ones described in U.S. Pat. No.4,668,357, in order to reduce the peroxy group content present therein and therefore to obtain, by subsequent chemical reduction, higher molecular weight functionalized derivatives.

The perfluoropolyoxyalkylenes obtained after chemical reduction exhibit end groups of the type -$CF_2COOR$ (R=H, $CH_3$), or -$CF_2COF$.

Such functionalized perfluoropolyoxyalkylenes can be subjected to reactions for the conversion of the end groups, such as reduction to alcohols, transesterification, salification, amidization etc., as are described for example in U.S. Pat. No. 3,810,874.

The high molecular weight functionalizod perfluoropolyoxyalkylenes so obtained are particularly suitable for being used in polycondensation reactions, for example in the preparation of polyesters and polyurethanes, or for being utilized as such for coating stony and metallic materials, and as luoricants for magnetic discs and gapes, etc.

The following exanples are given to illustrate the present invention; however they are not to be considered as a limitation of the scope thereof.

EXAMPLE 1

500 ml of $CF_3$—$CF_2Cl$ were introduced into a cylindrical glass reactor (500-ml volume and optical path of 1 cm), equipped with a sintered glass bottom and with a coaxial quartz inner sheath, with a thermo. regulation system utilizing a perfluorinated liquid and also equipped with a plunging pipe for letting in the gases, with a sheath with a thermocouple for taking the inner temperature, and with a reflux cooler maintained at a temperature of $-80°$ C.

Through the plunging pipe, a gaseous mixture composed of 35.4 N l/h of $O_2$ and 12.6 N l/h of $CF_2=CF_2$ ($O_2/CF_2=CF_2$ molar ratio=2.8) was bubbled into the reactor. By means of a cooling bach arranged outside the reactor, the temperature of the reacting liquid phase was maintained at $-50°$ C. for all the duration of the test.

After having introduced into the quartz sheath a Hanau type TQ 150 ultraviolet lamp (which emitted 13.2 w of ultraviolet radiation having a wavelength from 2,000 to 3,300 A°), the lamp was switched on, and the irradiation and the feeding of the two reacting gases were carried on for five hours.

The concentration of $CF_2=CF_2$ and of the by-products (such as for example

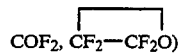

both in the liquid phase and in the gases leaving the reactor was determined by gaschromatographic analysis as the average of five samples drawn at regular intervals during the test.

After a five-hour irradiation, the lamp was switched off ano the solvent was removed from the reactor by evapotation at room temperature. 124 g of a polyrneric oily residue exhiting a very high viscosity were obtained. Such product, subjected to iodometric analysis, exhibited an active oxygen content equal to 2.6%. On NMR ¹⁹F (300 MH ) analysis it resumted to be composed of polyethereal-polyperoxy chains:

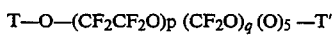
T—O—(CF$_2$CF$_2$O)$_p$ (CF$_2$O)$_q$ (O)$_5$ —T' with a p/q ratio equal to 1.56, where T and T' are end groups such as —CF$_3$, —CF$_2$CF$_3$ and —CF$_2$COF; the number average molecular weight (Mn) resulted to be equal to 200,000.

The product viscosity was determined by means of a flat-cone rotational viscosimeter, at 20° C., and resulted to be equal to 3,200,000 cSt.

The weight average molecular weight (Mw) was determined by means of fixed-angle light scattering measurement, thereby obtaining a value of 240,000.

The yield, expressed as grams of CF$_2$CF$_2$ converted into oil/grams of reacted CF$_2$CF$_2$, was of 51%, with a conversion, expressed as grams of CF$_2$CF$_2$ into oil/grams of fed CF$_2$CF$_2$, equal to 42%.

The data relating to the example are reported in Table I. In said Table, the solvents utilized in the examples are indicated with the following reference numbers:
Pentafluorochloroethan: 115
Dichlorodifluoromethane: 12

EXAMPLE 2

It was operated as in example 1, but using CF$_2$Cl$_2$ as a solvent at a temperature of −40° C. In this case there were fed 36.1 N 1/h of O$_2$ and 13.9 N 1/h of CF$_2$=CF$_2$, with a O$_2$/CF$_2$CF$_2$ molar ratio equal to 2.6.

After a five-hour reaction, from the reactor there where discharged 108 g of a polymer, which, on iodometric analysis, revealed an active oxygen content equal to 2.1%.

Subjected to NMR ¹⁹F analysis, the polymer resulted to be composed of polyethereal-polyperoxy chains:

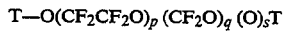
T—O(CF$_2$CF$_2$O)$_p$ (CF$_2$O)$_q$ (O)$_s$T with a p/q ratio equal to 0.89, where T are end groups of the type: —CF$_3$, —CF$_2$Cl, —CF$_2$CF$_2$Cl, —CF$_2$COF, —COF and —OCF$_2$CF$_2$Cl. The number average molecular weight was equal to 16,200. The product viscosity, determined at 20° C. by means of an Ostwald-Fenske viscosimeter, was equal to 1,15 cSt. The weight average molecular weight determination by means of fixed-angle light scattering gave a value of 20,000. The data relating to the example are reported in Table I.

EXAMPLE 3

It was operated as in example 1, but at a temperature of −45° C.

After a five-hour reaction from the reactor there were discharged 123 g of a polymer which, on iodometric analysis, exhibited an active oxygen content equal to 2.0%. On NMR ¹⁹F analysis, the polymer resulted to be composed of polyethereal-polyperoxy chains:

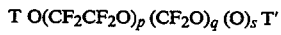
T O(CF$_2$CF$_2$O)$_p$ (CF$_2$O)$_q$ (O)$_s$ T' with a p/q ratio=1.19, where T and T' are end groups —CF$_3$, —CF$_2$CF$_3$, —CF$_2$CF$_2$Cl, —COF.

The polymer had a number average molecular weight equal to 95,000.

In this case the product viscosity was determined by means of a flat-cone rotational viscosimeter at 20° C. and resulted to be equal to 270,000 cSt.

The data of the example are reported in Table I .

EXAMPLE 4

It was operated as in example 1, but at a temperature of −55° C.

In this case, 40 N1/h of O$_2$ and 8 N1/h of CF$_2$=CF$_2$ were fed in an O$_2$/CF$_2$CF$_2$ molar ratio equal to 5. After a 5-hour reaction, 109 g of polymer were discharged from the reactor; on iodometric analysis, the polymer exhibited an active oxygen content equal to 1.8%.

The NMR ¹⁹F analysis revealed that the polymer was composed of polyethereal-polyperoxy chains:

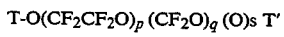
T-O(CF$_2$CF$_2$O)$_p$ (CF$_2$O)$_q$ (O)$_s$ T' with a p/q ratio =1.2, where T and T' are end groups of the type: —CF$_3$, —CF$_2$CF$_3$, —CF$_2$C$_1$, —CF$_2$CF$_2$Cl and —COF. The number average molecular weight of the polymer was equal to 68,000. The viscosity of the product, determined by means of a flat cone rotational viscosimeter at 20° C., was equal to 54,000 cSt.

The weight average molecular weight, determined by fixed-angle light scattering, was equal to 69,000.

EXAMPLE 5

It was operated as in example 4, but using CF$_2$Cl$_2$ as a solvent.

After a 5-hour reaction, 92 g of polymer were discharged from the reactor; on iodometric analysis, the polymer exhibited an active oxygen content equal to 1.5%. On NMR ¹⁹F analysis the polymer resulted to De composed of polyethereal-polyperoxy chains:

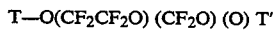
T—O(CF$_2$CF$_2$O) (CF$_2$O) (O) T' with a p/q ratio=0.92, where T and T' are end groups of the type: —CF$_3$, —CF$_2$Cl, —CF$_2$CF$_2$Cl, —COF, CF$_2$COF and OCF$_2$CF$_2$Cl. The number average molecular weight of the polymer was equal to 11,000. The viscosity of the product at 29° C. was equal to 387 cSt. The data of the example are reported in Table I.

EXAMPLE 6 a) An amount of 22.6 of the product obtained in example 1 was introduced into a 250-cc flask equipped with mechanical stirrer, thermometer, reflux cooler and dropping funnel, and 80 ml of CF$_2$Cl-CFCl$_2$ and 40 ml of CH$_3$OH were added thereto.

20 ml of HI at 57% by weight in aqueous solution were then gradually fed under stirring by means of the dropping funnel. On conclusion of the addition, the mixture was maintained at reflux for about 2 hours in order to complete the reaction. After having checked by means of NMR ¹⁹F analysis the complete disappearance of the peroxide, the mixture was transferred to the dropping funnel.

The lower phase was separated, washed one time with a 0,01 N solution of Na$_2$S$_2$O$_3$ in order to remove the I$_2$ residues, then it was washed with H$_2$O and anhydrified with Na$_2$SO$_4$. After evaporation of the solvent under vacuum (20 torr.) there were obrained 16.0 g of a product, which on NMR ¹⁹F analysis resulted to be composed of polyethereal chains:

Y—O(CF CF$_2$CF$_2$O) (CF$_2$O)$_q$—Y' with a p/q ratio=1.14, were Y and Y' are end groups of the type: —CF$_3$, —CF$_2$CF$_3$, —CF$_2$COOCH$_3$, —CF- $_2$COOH, wherefrom it results a functionality (F) expressed by the relation $$F = \frac{2 \times (\text{Ester} + \text{acid end groups})}{\text{Total end groups}}$$

equal to 1.99. —The number average molecular weight was equal to 1,000.

b) An amount of 22.3 g of the product obtained in example 1 dissolve in 200 ml of n-fluoroheptane was introduced into a cylindrical glass reactor (volume=250 ml and optical path=0.5 cm) equipped with a quartz inner sheath coaxial to a thermoregulating system utilizing perfluorinated liquids, and furthermore equipped with a plunging pipe for introducing an inert gas (N$_2$ at 0.5 l/h), a sheath with a thermocouple for detecting the inner temperature and a magnetic stirrer arranged on the flat bottom of the reactor.

By means of a refrigerating path arranged outside the reactor, the temperature of the reacting liquid phase was maintained at 0° for all the duration of the test. After having introduced an ultraviolet lamp, type Hanau T.Q. 150, into the quartz sheath, the lamp was swtiched on and the irradiation was continued for 2 hours. Then the solvent was evaporated at a temperature of 20° C. and under a vacuum of 0.5 tort. Subsequently the temperature was brought to 70° C. in order to completely remove the solvent traces.

There were obtained 16.7 g of a product which, on iodometric analysis, exhibited a peroxide content equal to 0.9%. On NMR $^{19}$F analysis, the product resulted to be composed of polyethereal chains:

Y—O(CF$_2$CF$_2$O)$_p$ (CF$_2$O) (O)$_s$Y' with a p/q ratio=1.23, where Y and Y' are end groups of the type: —CF$_3$, —CF$_2$CF$_3$, —CF$_2$COF, —COF, and having a number average molecular weight equal to 56,000. The product so obtained was reduced according to the modalities indicated at point (a) of the present example.

There were obtained 14.7 g of a product, which on NMR $^{19}$F analysis resulted to be composed of chains:

Y—O(CF$_2$CF$_2$O)$_p$ (CF$_2$O)$_q$ Y' with a p/q ratio=1.14, where Y and Y' are end groups of formula —CF$_3$, —CF$_2$CF$_3$, —CF$_2$COOCH$_3$, —CF$_2$COOH, wherefrom it resulted a functionality equal to 1.97. The number average molecular weight of the product was equal to 2,100.

c) An amount of 22.3 g of the product of example 1 was treated according to the same modalities as per point (b) of this example, but with a reaction time of 3 hours.

After irradiation, the product (15.0 g) exhibited an active oxygen content equal to 0.5% and on NMR $^{19}$F analysis it resulted to be composed of chains:

Y—O(CF$_2$CF$_2$O)$_p$ (CF$_2$O)$_q$ (O)$_s$—Y' with a p/q ratio=1.12, where Y and Y' are end groups —CF$_3$, —CF$_2$CF$_3$, —CF$_2$COF, —COF, and with a number average molecular weight equal to 28,000.

After reduction according to procedure (a) of the present example, the product (12.9 g), subjected to NMR $^{19}$F analysis, resulted to be composed of chains:

Y'—O—(CF$_2$CF$_2$O)$_p$ (CF$_2$O)$_q$ Y' with a p/q ratio=1.12, and in which Y, Y' are end groups of the type: —CF$_3$, —CF$_2$CF$_3$, —CF$_2$COOCH$_3$, —CF$_2$COOH. The product exhibited a functionality of 1.94 and a number average molecular weight equal to 3,200.

d) A portion of 39.6 g of the product of example 1 was introduced into a 250 cc flask equipped with a thermometer, and by means of a thermostatic bath it was gradually heated up to a temperature of 185° C. and was maintained at this temperature for 3 hours unaer a slight nitrogen flow (0.5 l/h). After reaction, the product (29.8 g) had an —active oxygen content equal to 0.7%. On NMR $^{19}$F analysis, it resulted to be composed of chains:

Y O(CF$_2$CF$_2$O)$_p$ (O)$_s$ (CF$_2$O)$_q$ Y' with a p/q ratio=1.22, where Y and Y' are end groups of formula —CF$_3$, —CF$_2$CF$_3$, —CF$_2$COF and —COF, and it had a number average molecular weight equal to 103,000. The product so obtained was reduced according to the procedure illustrated under point (a) of this example. 26.6 g of product were obtained, which, subjected to NMR $^{19}$F analysis, resulted to be composed of chains:

Y O(CF$_2$CF$_2$O)$_p$ (CF$_2$O)$_q$ Y' with a p/q ratio=1.07, where Y and Y' are end groups of formula —CF$_3$, —CF$_2$CF$_3$, —CF$_2$COOCH$_3$, —CF$_2$COOH. Such product exhibited a functionality equal to 1.97 and a molecular weight equal to 2,400.

EXAMPLE 7

Using the same apparatus as in example 1, a photosynthesis was carried out under the same conditions of said example, except that it was operated at a temperature of −45° C. with a CF$_2$CF$_2$ flowrate equal to 8.8 N l/h and an oxygen flow-rate equal to 35.2 N l/h.

After a 5-hour reaction, from the reactor there were discharged 99 g of polymer, which, on iodometric analysis, expired a peroxide content (PO) equal to 1.8%.

On NMR $^{19}$F analysis, the polymer resulted to be composed of polyethereal-polyperoxy chains having structure:

T O(CF$_2$CF$_2$O)$_p$ (CF$_2$O)$_q$ (O) T' with a p/q ratio=0.97 where T and T' are end groups —CF$_3$, —CF$_2$CF$_3$, CF$_2$CF$_2$Cl, —CF$_2$COF, and with a number average molecular weight equal to 69,000.

The product viscosity was determined at 20° C. by means of an Ostwald-Fenske viscosimeter and resulted to be equal to 68,000 cSt.

EXAMPLE 8

A photosyntehsi s was effected under the same conditions of example 7, but using dichlorodifluoromethane as a solvent.

After a 5-hour reaction, 90 g of polymer were discharged from the reactor; on iodometric analysis, the polymer exhibited a PO (peroxide content) equal to 1,7%.

On NMR $^{19}$F analysis, the polymer resulted to be composed of polyethereal-polyperoxy chains of structure:

T O(CF$_2$CF$_2$O)$_p$(CF$_2$O)$_q$ (O) T' with a p/q ratio=0.75, where T and T' are end groups —CF$_3$, —CF$_2$C$_1$, —CF$_2$CF$_2$Cl, —COF, and with a number average molecular weight equal to 9,800.

The viscosity at 20° C. determined by means of an Ostwald-Fenske viscosimeter was equal to 280 cSt.

EXAMPLE 9

Using the same apparatus as in example 1, a photosynthesis was effected under the same conditions as in said example, with the exception that it was operated at −45° C. with a CF$_2$CF$_2$ flowrate equal to 11 N 1/h and an oxygen flow-rate equal to 33 N1/h, After a 5-hour reaction, 139 g of polymer were discharged from the reactor; on iodometric analysis, the polymer exhibited a PO content equal to 2.0%.

On NMR $^{19}$F analysis, the polymer resulted to be composed of perfluoroethereal-polyperoxy chains having structure:

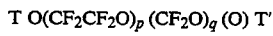

T O(CF$_2$CF$_2$O)$_p$ (CF$_2$O)$_q$ (O) T' with a p/q ratio=1.23, where T and T' are end groups —CF$_3$, —CF$_2$CF$_3$, —CF$_2$CF$_2$Cl, —CF$_2$COF and with a number average molecular weight equal to 100,000. The determination of the weight average molecular weight (Mw) effected by means of light scattering gave a value equal to 141,000.

In this case, the product viscosity was determined at 20° C. by means of a flat-cone rotational viscosimeter and —it resulted to be equal to 378,000 cSt.

EXAMPLE 10

A photosynthesis was carried out under the same conditions of example 9, but using difluorodichloromethane as a solvent.

After a 5-hour reaction, 124 g of polymer were discharged from the reactor; on iodometric analysis, the polymer exhibited a PO content equal to 2.1%.

On NMR $^{19}$F analysis, the polymer resulted to be composed of polyethereal-polyperoxy chains of structure:

T O(CF$_2$CF$_2$0)$_p$ (CF$_2$O)$_q$ (O)$_s$ T' with a p/q ratio =0.98, where T and T' are end groups —CF$_3$, —CF$_2$Cl, —CF$_2$CF$_2$Cl, —CF$_2$COF, and with a number average molecular weight equal to 11,600.

The viscosity, determined at 20° C. by means of an Ostwald-Fenske viscosimeter, was equal to 660 cSt.

EXAMPLE 11

Using the same apparatus of example 1, a photosynthesis was carried out under the same conditions as in said example except that it was operated at a temperature of −55° C., with a CF$_2$CF$_2$ flowrate equal to 11 N 1/h and a oxygen flowrate equal to 33 N 1/h.

After a 4-hour reaction, 120 g of polymer were discharged from the reactor; on iodometric analysis, the polymer exhibited a PO content equal to 2.7%.

On NMR $^{19}$F analysis the polymer resulted to be composed of polyethereal-polyperoxy chains having structure:

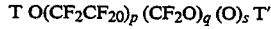

T O(CF$_2$CF$_2$O)$_p$ (CF$_2$O)$_q$ (O)$_s$ T' with a p/q ratio=2.13, where T and T' are end groups −CF$_3$, —CF$_2$CF$_3$, —CF$_2$CF$_2$Cl, —CF$_2$COF, and with a number average molecular weight equal to 155,000.

The weight average molecular weight (Mw) determined by means of light scattering was equal to 170,000.

The product viscosity, determined at 20° C. by means of a flat-cone rotational viscosimeter, was equal to 1,190,000 cSt.

EXAMPLE 12

A photosynthesis was carried out under the same conditions as in example 11, but using difluorodichloromethane as a solvent.

After a 5-hour reaction, 151 g of polymer were discharged from the reactor; on iodometric analysis, the polymer exhibited a PO content equal to 2.3%.

On NMR $^{19}$F analysis, the polymer resulted to be composed of polyethereal-polyperoxy chains of structure:

T O(CF$_2$CF$_2$O)$_p$(CF$_2$O)$_q$(O)$_s$T' with a p/q ratio=1.47, where T and T' are end groups —CF$_3$, —CF$_2$Cl, —CF$_2$CF$_2$Cl, —CF$_2$COF, and with a number average molecular weight equal to 17,200.

The product viscosity, determined at 20° C. by means of an Ostwald-Fenske viscosimeter, was equal to 2,600 cSt.

EXAMPLE 13

Using the same apparatus as in example 1, a photosynthesis was carried out under the same conditions of said example, except that it was operated at a temperature of −45° C., with a CF$_2$CF$_2$ flowrate equal to 7.3 N1/h and with an oxygen flowrate equal to 36.7 N1/h.

After a 5-hour reaction, 92 g of polymer were discharged from the reactor; on iodometric analysis, the polymer exhibited a PO content equal to 1.5%.

On NMR $^{19}$F analysis the polymer resulted to be composed of polyethereal-polyperoxy chains of structure:

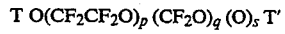

T O(CF$_2$CF$_2$O)$_p$ (CF$_2$O)$_q$ (O)$_s$ T' with a p/q ratio=0.88, where T and T' are end groups —CF$_3$, —CF$_2$CF$_3$, —CF$_2$CF$_2$Cl, —CF$_2$COF, and with a number average molecular weight equal to 42,100.

The product viscosity, determined at 20° C. by means of an Ostwald-Fenske viscosimeter, was equal to 17,000 cSt.

EXAMPLE 14

Following the same modalities of example 1, a photosynthesis was carried out in a 250 ml reactor by using 250 ml of solvent. In this case, the test was conducted at a temperature of −45° C. with a C$_2$F$_4$ flowrate equal. to 22.4 N1/h and an oxygen flowrate equal to 37.5 N1/h. After 1-hour reaction, 57 g of polymer were discharged from the reactor; on iodometric analysis, the polymer exhibited a PO content equal to 3.1%

On NMR $^{19}$F analysis, the polymer resulted to be composed of polyethereal-polyperoxy chains of structure:

T O(CF$_2$CF$_2$O)$_p$ (CF$_2$O)$_q$ (O)$_s$ T' with a p/q ratio=2.63, where T and T' are end groups −CF$_3$, —CF$_2$CF$_3$, —CF$_2$CF$_2$Cl, —CF$_2$COF.

The product viscosity, determined at 20° C. by means of a flat-cone rotational viscosimeter, was equal to 650,000 cSt. The weight average molecular weight (Mw) determined by means of light scattering was equal to 150,000.

EXAMPLE 15

A photosynthesis was carried out under the same conditions as in example 14, but using difluorodichloromethane as a solvent.

After a 1-hour reaction, 58 g of polymer were discharged from the reactor; on iodometric analysis, the polymer exhibited a PO content equal to 2.5%.

On NMR $^{19}$F analysis, the polymer resulted to be composed of polyethereal-polyperoxy chains of structure:

$$T\ O(CF_2CF_2O)_p\ (CF_2O)_q\ (O)_s\ T'$$

with a p/q ratio = 1.61, Where T and T' are end groups —$CF_3$, —$CF_2Cl$, —$CF_2CF_2Cl$, —$CF_2COF$.

The viscosity, determined at 20° C. by means of an Ostwald-Fenske viscosimeter, was equal to 3,850 cSt.

EXAMPLE 16

Following the same procedure of example 1, a photosynthesis was effected in a 900 ml reactor. In this case the test was carried out at a temperature of —45° C. with a $C_2F_4$ flowrate equal to 28 Nl/h and an oxygen flowrate equal to 40 Nl/h. After a 2.5-hour reactor, 185 g of polymer were discharged from the reactor; on iodometric analysis, the polymer exhibited a PO content equal to 3.5%.

On NMR $^{19}$F analysis the polymer resulted to be composed of polyethereal-polyperoxy chains having structure:

$$T\ O(CF_2CF_2O)_p\ (CF_2O)_q\ (O)_s\ T'$$

with a p/q ratio=2.38, where T and T' are end groups —$CF_3$, —$CF_2CF_3$, $CF_2CF_2Cl$, —COF.

The product viscosity, determined at 20° C. by means of a flat-cone rotational viscosimeter, was equal to 3,784,000 cSt. The weight average molecular weight (Mw) determined by means of light scattering was equal to 280,000.

EXAMPLE 17 a) A portion of 20 g of the product obtained in example 2 was reduced according tQ the procedure described in example 6 a).

There were obtained 16 g of product which, on NMR $^{19}$F analysis, resulted to be composed of $$Y\ O(CF_2CF_2O)_p\ (CF_2O)_q\ Y'$$

with a p/q ratio=0.7, with Y and Y' being end groups such as —$CF_3$, —$CF_2Cl$, —$CF_2CF_2Cl$, —$CF_2COOCH_3$, $CF_2COOH$, wherefrom it resulted a functionality equal to 1.94 and a number average molecular weight equal to 870.

b) A portion of 50 g of the product obtained in example 2 was treated according to the modalities of example 6 d), but for a time of 3 hours.

42.5 g of product were obtained, which, on iodometric analysis, exhibited an active oxygen content equal to 1,2%. On NMR $^{19}$F analysis it resulted to be composed of chains:

$$Y\ O(CF_2CF_2O)_p(O)_s(CF_2O)_q\ Y'$$

with a p/q ratio=0.76, where Y, Y' are end groups such as —$CF_3$, —$CF_2Cl$, —$CF_2CF_2Cl$, —$CF_2COF$, —COF and -$OCF_2CF_2Cl$, the number average molecular weight being equal to 15,000. The product so obtained was then reduced as in example 6 a). There were obtained 36 g of product which, on NMR $^{19}$F analysis, resulted to be composed of chains:

$$Y\ O(CF_2CF_2O)_p\ (CF_2O)_q\ Y'$$

with a p/q ratio=0.66, where Y and Y' are end groups of the type: —$CF_3$, —$CF_2Cl$, —$CF_2CF_2Cl$, —$CF_2COOCH_3$, —$CF_2COOH$, and wherefrom it resulted a functionality equal to 1.88 and a number average molecular weight equal to 1,330.

EXAMPLE 18

A portion of 60.7 g of the product obtained in example 4 was reduced according to the procedure described in example 6 a).

There were obtained 52.9 g of product which, on NMR $^{19}$F analysis, resulted have the following structure:

$$Y\ O(CF_2CF_2O)_p\ (CF_2O)_q\ Y'$$

with a p/q ratio=0.95 and with Y, Y' being end groups of the type: —$CF_3$, —$CF_2CF_3$, —$CF_2Cl$, —$CF_2CF_2Cl$, —$CF_2COOCH_3$ and $CF_2COOH$, the number average molecular weight being equal to 1,270 and the functionality being equal to 1.98.

EXAMPLE 19

A portion equal to 57.4 g of the product obtained in example 5 was reduced according to the procedure described in example 6 a). There were obtained 48 g of a product which, on $^{19}$F NMR analysis, resulted to have the following structure:

$$Y\ O(CF_2CF_2O)_p(CF_2O)_q\ Y$$

with a p/q ratio=0.71 and with Y being end groups of type: —$CF_3$, —$CF_2Cl$, —$CF_2CF_2Cl$, —$CF_2COOCH_3$, —$CF_2COOH$, and having a functionality equal to 1.83 and a number average molecular weight equal to 1,350.

EXAMPLE 20

A portion of 80.5 g of the product obtained in example 3 was subject to a thermal treatment as is described in example 6 d) and was maintained at 180° C. for 2 hours.

The product obtained (69.8 g) resulted to have an active oxygen content equal to 1.15%. On $^{19}$F NMR analysis it exhibited the following structure:

$$Y\ O(CF_2CF_2O)_p\ (CF_2O)_q\ (O)_s\ Y'$$

with a p/q ratio=1.03, where Y, Y' are end groups of type —$CF_3$, —$CF_2CF_3$, —$CF_2CF_2Cl$, —$CF_2COF$; the number average molecular weight was equal to 89,000.

The resulting product was reduced according to the procedure described in example 6 a), thereby obtaining 64.8 g of a derivative which, on $^{19}$F NMR analysis, exhibited the structure:

$$Y\ O(CF_2CF_2O)_p\ (CF_2O)_q\ Y'$$

with a p/q ratio=0.88 and with Y and Y' being end groups of type —$CF_3$, —$CF_2CF_3$, —$CF_2CF_2Cl$, —$CF_2COOCH_3$ and —$CF_2COOH$.

The number average molecular weight was equal to 1,530 and the functionality was equal to 1.97.

The operative modalities utilized in the examples and the characteristics of the obtained products are reported in Table I.

TABLE I

| Ex. No. | T (°C.) | time (h) | TFE (mols/h) | Solv. | React. vol. | U.V. (W) | F/(V*E) * $10^{-4}$ | O2 (Nl/h) | TFE (Nl/h) |
|---|---|---|---|---|---|---|---|---|---|
| 1 | −50 | 5 | 0.56 | 115 | 500 | 13.2 | 0.85 | 35.4 | 12.6 |
| 2 | −40 | 5 | 0.62 | 12 | 500 | 13.2 | 0.94 | 36.1 | 13.9 |
| 3 | −45 | 5 | 0.56 | 115 | 500 | 13.2 | 0.85 | 35.4 | 12.6 |
| 4 | −55 | 5 | 0.36 | 115 | 500 | 13.2 | 0.54 | 40 | 8 |
| 5 | −55 | 5 | 0.36 | 12 | 500 | 13.2 | 0.54 | 40 | 8 |
| 7 | −45 | 5 | 0.39 | 115 | 500 | 13.2 | 0.59 | 35.2 | 8.8 |
| 8 | −45 | 5 | 0.39 | 12 | 500 | 13.2 | 0.59 | 35.2 | 8.8 |
| 9 | −45 | 5 | 0.49 | 115 | 500 | 13.2 | 0.74 | 33 | 11 |
| 10 | −45 | 5 | 0.49 | 12 | 500 | 13.2 | 0.74 | 33 | 11 |
| 11 | −55 | 4 | 0.49 | 115 | 500 | 13.2 | 0.74 | 33 | 11 |
| 12 | −55 | 5 | 0.49 | 12 | 500 | 13.2 | 0.74 | 33 | 11 |
| 13 | −45 | 5 | 0.33 | 115 | 500 | 13.2 | 0.49 | 36.7 | 7.3 |
| 14 | −45 | 1 | 1 | 115 | 250 | 13.2 | 3.03 | 37.5 | 22.4 |
| 15 | −45 | 1 | 1 | 12 | 250 | 13.2 | 3.03 | 37.5 | 22.4 |
| 16 | −45 | 2.5 | 1.25 | 115 | 900 | 13.2 | 1.05 | 40 | 28 |

| Ex. No. | O2/TFE | Yield % | Conv. % | TFE (g rec.) | product (g) | PO | p/q | Visc. (cSt.) | TFE conc. in the solv. ($10^{-2}$ mole/l) |
|---|---|---|---|---|---|---|---|---|---|
| 1 | 2.8 | 51 | 42 | 47.8 | 124 | 2.6 | 1.56 | 3200000 | 8.4 |
| 2 | 2.6 | 33 | 29 | 43 | 108 | 2.1 | 0.89 | 1150 | 5.7 |
| 3 | 2.8 | 49 | 43 | 36.6 | 123 | 2 | 1.19 | 270000 | 5.7 |
| 4 | 5 | 59 | 54 | 14.3 | 109 | 1.8 | 1.2 | 54000 | 4.6 |
| 5 | 5 | 48 | 45 | 12.5 | 92 | 1.5 | 0.92 | 387 | 3.1 |
| 7 | 4 | 48 | 41 | 27.9 | 99 | 1.8 | 0.97 | 68000 | 5.2 |
| 8 | 4 | 42 | 37 | 23.8 | 90 | 1.7 | 0.75 | 280 | 3.6 |
| 9 | 3 | 51 | 44 | 31.4 | 139 | 2 | 1.23 | 378000 | 6 |
| 10 | 3 | 44 | 39 | 27 | 124 | 2.1 | 0.98 | 660 | 4.6 |
| 11 | 3 | 59 | 53 | 19.4 | 120 | 2.7 | 2.13 | 1190000 | 7.4 |
| 12 | 3 | 52 | 48 | 19.6 | 151 | 2.3 | 1.47 | 2600 | 5.2 |
| 13 | 5 | 50 | 44 | 21.8 | 92 | 1.5 | 0.88 | 17000 | 4.1 |
| 14 | 1.67 | 58 | 45 | 21.4 | 57 | 3.1 | 2.63 | 650000 | 18.2 |
| 15 | 1.67 | 54 | 46 | 15.8 | 58 | 2.5 | 1.61 | 3850 | 9.7 |
| 16 | 1.41 | 52 | 47 | 39.1 | 185 | 3.5 | 2.38 | 3784000 | 10.8 |

We claim:

1. Peroxy perfluoropolyoxyalkylenes consisting of —CF$_2$O— and —CF$_2$CF$_2$O—units, peroxidic oxygen atoms, and two end groups, wherein the end groups, like or different from each other, are selected from the group consisting of —CF$_3$, —C$_2$F$_5$, —CF$_2$Cl, —CF$_2$CF$_2$Cl, —COF, and CF$_2$COF, and wherein said peroxy perfluoropolyoxyalkyles having a ratio of —CF$_2$CF$_2$O—units to —CF$_2$O—units of from 0.4 to 5, a peroxidic oxygen content not exceeding 4% by weight and a viscosity of from 300,000 to 8,000,000 cSt at 20° C.

2. Peroxy perfluoropolyoxyalkylenes of claim 1, having a peroxide content ranging from 0.1 to 3.5%.

3. A process for preparing peroxy perfluoropolyoxyalkylenes, which comprises subjecting a mixture of tetrafluoroethylene and oxygen to photo-oxidation under ultraviolet radiations having a wavelength from 200 to 600 nm, in the presence of pentafluorochloroethane as a solvent.

4. The process of claim 3, wherein the process is operated in a reactor with F/$v_{xE}$ ratio values ranging from 0.1 to 50×10$^{-4}$, where F is the number of mols/h of tetrafluoroethylene fed to the reactor, V is the reactor volume in ml, E represents the watts of ultraviolet radiation having a wavelength below 330 nm.

5. The process of claim 3, wherein the process is operated with F/$v_{xE}$ ratio values ranging from 0.1 to 3×10$^{-4}$, where F, V and E are defined as in claim 4.

6. The process of claim 3, wherein the reaction is conducted at temperatures ranging from −45° C. to −80° C.

7. The process of claim 3 wherein the concentration of tetra-fluoroethylene in the solvent during the reaction is at least 6×10$^{-2}$ moles/liter.

* * * * *